United States Patent
Soga (10) Patent No.: US 6,595,599 B2
(45) Date of Patent: Jul. 22, 2003

(54) BRAKE CONTROL APPARATUS AND METHOD FOR A VEHICLE

(75) Inventor: Masayuki Soga, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/994,818

(22) Filed: Nov. 28, 2001

(65) Prior Publication Data

US 2002/0079736 A1 Jun. 27, 2002

(30) Foreign Application Priority Data

Dec. 21, 2000 (JP) ........................................ 2000-388506

(51) Int. Cl.⁷ ................................................ B60T 8/00
(52) U.S. Cl. ............................... 303/113.1; 303/122.04; 303/119.1; 701/76
(58) Field of Search ............................... 303/113.1, 186, 303/113.5, 119.1, 139, 116.1, 140, 122.03, 122.05, 122.04, 9.63, 6.01, 13–14, 189, 187, 122.02, 122.09–122.15, DIG. 1; 701/76, 71, 92, 70; 318/362, 372, 375, 380, 563, 564; 188/151 A (56) References Cited

U.S. PATENT DOCUMENTS 5,004,300 A * 4/1991 Brearley et al.
5,952,799 A * 9/1999 Maisch et al. .............. 303/146

FOREIGN PATENT DOCUMENTS

| JP | B2 2613588 | 2/1997 |
| JP | A 10-76925 | 3/1998 |
| JP | A 2000-247219 | 9/2000 |

* cited by examiner

Primary Examiner—Douglas C. Butler
(74) Attorney, Agent, or Firm—Oliff & Berridge, PLC (57) ABSTRACT

A brake control apparatus for a motor vehicle includes first and second pressure regulators that regulate a pressure of a hydraulic fluid supplied from a high-pressure fluid supply source to first and second wheel cylinders, and a communication control device that controls fluid communication between the first and second wheel cylinders. A controller of the apparatus includes first and second control units that control the first and second pressure regulators, respectively. The controller determines whether one of the first and second control units may be failing to operate normally, and places the communication control device in an operating position for communicating the first and second wheel cylinders with each other when it is determined that the first or second control unit may be failing to operate normally.

20 Claims, 7 Drawing Sheets

BRAKE CONTROL APPARATUS AND METHOD FOR A VEHICLE

INCORPORATION BY REFERENCE

The disclosure of Japanese Patent Application No. 2000-388506 filed on Dec. 21, 2000, including the specification, drawings and abstract is incorporated herein by reference in its entirety.

BACKGROUND OF THE INVENTION

1. Field of Invention

The invention relates to brake control apparatus and methods for a vehicle, such as an automobile, and more particularly to brake control apparatus and methods for controlling a pressure in a wheel cylinder of each wheel using a high-pressure hydraulic fluid fed from a high-pressure fluid supply source.

2. Description of Related Art

As one type of brake control apparatus for vehicles, such as automobiles, a so-called brake-by-wire type brake control apparatus is known in the art. An example of the brake-by-wire type brake control apparatus is disclosed in Japanese Patent Application Laid-Open No. 2000-247219. The brake control apparatus includes a master cylinder, a high-pressure fluid supply source, wheel cylinders corresponding to vehicle wheels, and cutoff devices for cutting off communication between the master cylinder and the wheel cylinders when the apparatus is in a brake pressure control mode. The brake control apparatus further includes pressure regulating devices for regulating pressures of a hydraulic fluid supplied from the high-pressure fluid supply source to the respective wheel cylinders, communication control devices for controlling communication between two wheel cylinders on the downstream side of the pressure regulating devices, and a controller for controlling the pressure regulating devices according to the amount of a braking operation performed by a driver.

In the above-mentioned brake control apparatus, even when an abnormality occurs in one of the pressure regulating devices corresponding to one of two wheels associated with two wheel cylinders that may communicate with each other via a corresponding communication control device, the communication control device is placed in an operating state for connecting the two wheel cylinders with each other to permit fluid communication, so that the pressure in the wheel cylinder of the above-indicated one wheel can be controlled by controlling the pressure in the wheel cylinder of the other wheel by that other wheel's pressure regulating device. Therefore, upon occurrence of an abnormality in the pressure regulating device of one wheel, the braking control performance of the braking control apparatus is not reduced or deteriorated very much as compared with the case of a conventional brake-by-wire type brake control apparatus that is typically not provided with communication control devices.

The above-mentioned brake control apparatus may suffer from the following problem. When the controller itself becomes unable to operate normally due to, for example, a reduction in the voltage of a power source for controlling the pressure regulating devices, the pressure regulating devices cannot be controlled normally. In such a case, the brake control apparatus needs to be returned to a non-control mode, by placing the cutoff devices in a position for allowing communication between the master cylinder and the wheel cylinders, so that the pressures in the wheel cylinders are directly controlled by the master cylinder.

SUMMARY OF THE INVENTION

It is one object of the invention to provide a brake control apparatus for a vehicle, which is able to continue brake-by-wire type braking force control even when a voltage of a power source for controlling pressure regulating devices is lowered.

To accomplish the above and/or other object(s), there is provided according to one aspect of the invention a brake control apparatus for a motor vehicle, which includes: (a) first and second pressure regulators that regulate a pressure of a hydraulic fluid supplied from a high-pressure fluid supply source to first and second wheel cylinders, (b) a communication control device that controls fluid communication between the first and second wheel cylinders, the communication control device being connected between the first pressure regulator and the first wheel cylinder and between the second pressure regulator and the second wheel cylinder, and (c) a controller that controls the first and second pressure regulators according to at least an amount of a braking operation performed by a vehicle operator. The controller includes first and second control units that control the first and second pressure regulators, respectively, and is operable to determine whether one of the first and second control units may be failing to operate normally. In this brake control apparatus, the communication control device is placed in an operating position for communicating the first and second wheel cylinders with each other when it is determined that the first or second control unit may be failing to operate normally. In this manner, the pressures in the first and second wheel cylinders are controlled to the same level, and are surely prevented from differing from each other to a large extent.

In one embodiment of the invention, when it is determined that one of the first and second control units may be failing to operate normally, the controller stops using the failing one of the first and second control units to control its corresponding pressure regulator, and instead controls both of the first and second pressure regulators using the other control unit (i.e., the control unit that is not failing). Thus, even in the case where one of the first and second control units is not able to continue controlling its corresponding pressure regulating device, the pressures in the first and second wheel cylinders can be surely controlled to the same level by means of the other control unit.

The first and second wheel cylinders as indicated above may be provided for right and left wheels, respectively. In this case, when one of the first and second control units becomes unable to operate normally, the braking forces applied to the right and left wheels will not differ from each other to a large extent, and an excessively large yaw moment is prevented from acting on the vehicle due to the otherwise possible difference between the braking forces for the right and left wheels.

In a further embodiment of the invention, the first control unit includes a first power source that supplies power for controlling the first pressure regulator, and the second control unit includes a second power source that supplies power for controlling the second pressure regulator. In this case, it is determined that the first or second control unit may be failing to operate normally when a voltage of the first or second power source is reduced to be less than a reference value. Thus, when the first or second control unit may become unable to operate normally due to a reduction in the voltage of the first or second power source, the communication control device is reliably operated to communicate the first and second wheel cylinders with each other.

In a yet another embodiment of the invention, when the controller determines that one of the control units may be failing due to a reduction in the voltage of one of the first and second power sources, one of the first and second control units that corresponds to the one of the first and second power sources stops controlling its corresponding pressure regulator, and the other of the first and second control units that corresponds to the other power source controls that pressure regulator. Since the other control unit corresponding to the normally operating power source controls both pressure regulators while the first and second wheel cylinders are held in communication with each other via the communication control device, the pressures in the first and second wheel cylinders can be controlled to the same level with high reliability even if one of the first and second control units is unable to operate normally due to a reduction in the voltage of the corresponding power source.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

Hereinafter, preferred embodiments of the invention will be described with reference to the accompanying drawings.

Figure 1:
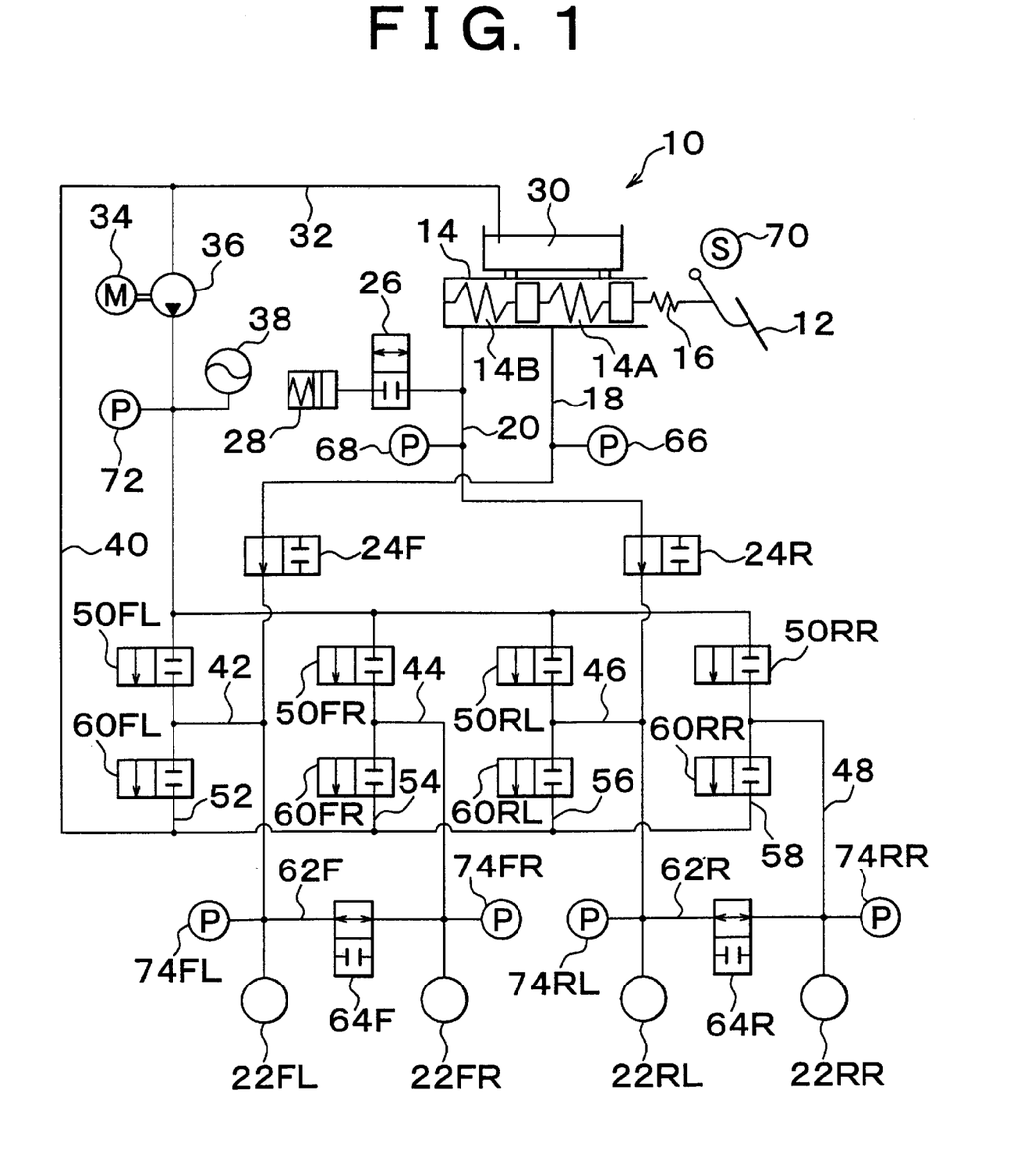
FIG. 1 is a schematic diagram showing a hydraulic circuit in a brake control apparatus according to one embodiment of the invention.

FIG. 1 schematically shows a hydraulic circuit and an electronic control unit provided in a brake control apparatus for a vehicle according to an exemplary embodiment of the invention. For the sake of brevity and simplification, a solenoid of each solenoid-operated valve is not illustrated in FIG. 1.

Referring to FIG. 1, reference numeral 10 denotes an electrically controlled, hydraulic brake system. The brake system 10 has a master cylinder 14 which delivers brake oil to the hydraulic circuit under pressure in response to a driver's operation to depress or press down a brake pedal 12. A dry stroke simulator 16 is provided between the brake pedal 12 and the master cylinder 14.

The master cylinder 14 has a first master cylinder chamber 14A and a second master cylinder chamber 14B. A brake pressure supply conduit 18 for front wheels is connected at one end to the first master cylinder chamber 14A, and a brake pressure supply conduit 20 for rear wheels is connected at one end to the second master cylinder chamber 14B. Wheel cylinders 22FL, 22RL for controlling braking forces for a front-left wheel and a rear-left wheel are connected to the other ends of the brake pressure supply conduits 18, 20, respectively.

Solenoid-operated valves (master cut valves) 24F, 24R of normally-open type are provided at certain points of the brake pressure supply conduits 18, 20, respectively. The solenoid-operated valves 24F, 24R function as cutoff devices for controlling communication between the first and second master cylinder chambers 14A, 14B and the corresponding wheel cylinders, respectively. In addition, a wet stroke simulator 28 is connected to the brake pressure supply conduit 20 between the master cylinder 14 and the solenoid-operated valve 24R, via a normally-closed type solenoid-operated valve 26.

A reservoir 30 is connected to the master cylinder 14, and a pressure supply conduit 32 is connected at one end thereof to the reservoir 30. An oil pump 36 driven by an electric motor 34 is provided at a certain point of the pressure supply conduit 32. An accumulator 38 that stores a high hydraulic pressure is connected to a portion of the pressure supply conduit 32 located on the discharge side of the oil pump 36. An oil discharge conduit 40 is connected to a portion of the pressure supply conduit 32 that is located between the reservoir 30 and the oil pump 36.

The pressure supply conduit 32 on the discharge side of the oil pump 36 is connected to the brake pressure supply conduit 18 between the solenoid-operated valve 24F and the wheel cylinder 22FL via a hydraulic control conduit 42, and is connected to the wheel cylinder 22FR for a front-right wheel via a hydraulic control conduit 44. The pressure supply conduit 32 is also connected to the brake pressure supply conduit 20 between the solenoid-operated valve 24R and the wheel cylinder 22RL via a hydraulic control conduit 46, and is connected to the wheel cylinder 22RR for a rear-right wheel via a hydraulic control conduit 48.

Solenoid-operated valves 50FL, 50FR, 50RL, 50RR of normally-closed type are provided at certain points of the hydraulic control conduits 42, 44, 46, 48, respectively. The hydraulic control conduits 42, 44, 46, 48 on the side of the wheel cylinders 22FL, 22FR, 22RL, 22RR with respect to the solenoid-operated valves 50FL, 50FR, 50RL, 50RR are connected to the oil discharge conduit 40 via hydraulic control conduits 52, 54, 56, 58, respectively. Solenoid-operated valves 60FL, 60FR, 60Rl, 60RR are provided at certain points of the hydraulic control conduits 52, 54, 56, 58, respectively.

The solenoid-operated valves 50FL, 50FR, 50RL, 50RR function as pressure-increasing control valves for increasing the pressures in the wheel cylinders 22FL, 22FR, 22RL, 22RR, respectively. The solenoid-operated valves 60FL, 60FR, 60RL, 60RR function as pressure-reducing control valves for reducing the pressures in the wheel cylinders 22FL, 22FR, 22RL, 22RR, respectively. These solenoid-operated valves cooperate with each other to control supply of high-pressure oil from the accumulator 38 to each of the wheel cylinders and discharge of the oil from each wheel cylinder. Thus, the solenoid-operated valves 50FL, 50FR, 50RL, 50RR, 60FL, 60FR, 60RL and 60RR are pressure regulating devices for increasing and reducing pressures in the corresponding wheel cylinders.

The pressure supply conduit 18 for the front wheels and the hydraulic control conduit 44 for the front-right wheel are connected to each other via a connecting conduit 62F at their locations close to the corresponding wheel cylinders 22FL, 22FR. A normally-open type solenoid-operated valve 64F is provided at a certain point of the connecting conduit 62F. The connecting conduit 62F and the solenoid-operated valve 64F function as a second communication control device for controlling fluid communication between the wheel cylinders 22FL, 22FR.

Similarly, the pressure supply conduit 20 for the rear wheels and the hydraulic control conduit 48 for the rear-right wheel are connected to each other via a connecting conduit 62R at their locations close to the corresponding wheel cylinders 22RL, 22RR. A normally-open type solenoid-operated valve 64R is provided at a certain point of the connecting conduit 62R. The connecting conduit 62R and the solenoid-operated valve 64R function as a first communication control device for controlling the communication between the wheel cylinders 22RL, 22RR.

As shown in FIG. 1, a pressure sensor 66 for sensing the pressure in the brake pressure supply conduit 18 as a first master cylinder pressure Pm1 is provided in a portion of the supply conduit 18 between the first master cylinder chamber 14A and the solenoid-operated valve 24F. Similarly, a pressure sensor 68 for sensing the pressure in the brake pressure supply conduit 20 as a second master cylinder pressure Pm2 is provided in the supply conduit 20 between the second master cylinder chamber 14B and the solenoid-operated valve 24R.

The brake pedal 12 is provided with a stroke sensor 70 for sensing a stroke St of the brake pedal depressed by the driver. A pressure sensor 72 for sensing the pressure in the pressure supply conduit 32 as an accumulator pressure Pa is provided in the conduit 32 on the discharge side of the oil pump 36.

Pressure sensors 74FL, 74RL are respectively provided in the brake pressure supply conduits 18, 20 between the solenoid-operated valves 24F, 24R and the wheel cylinders 22FR, 22RL. The pressure sensors 74FL, 74RL function to detect the pressures in the corresponding conduits as pressures Pfl, Prl in the wheel cylinders 22FL, 22RL. In addition, pressure sensors 74FR, 74RR are respectively provided in the hydraulic control conduits 44, 48 between the solenoid-operated valves 50FR, 50RR and the wheel cylinders 22FR, 22RR. The pressure sensors 74FR, 74RR function to detect the pressures in the corresponding conduits as pressures Pfr, Prr in the wheel cylinders 22FR, 22RR.

Figure 2:
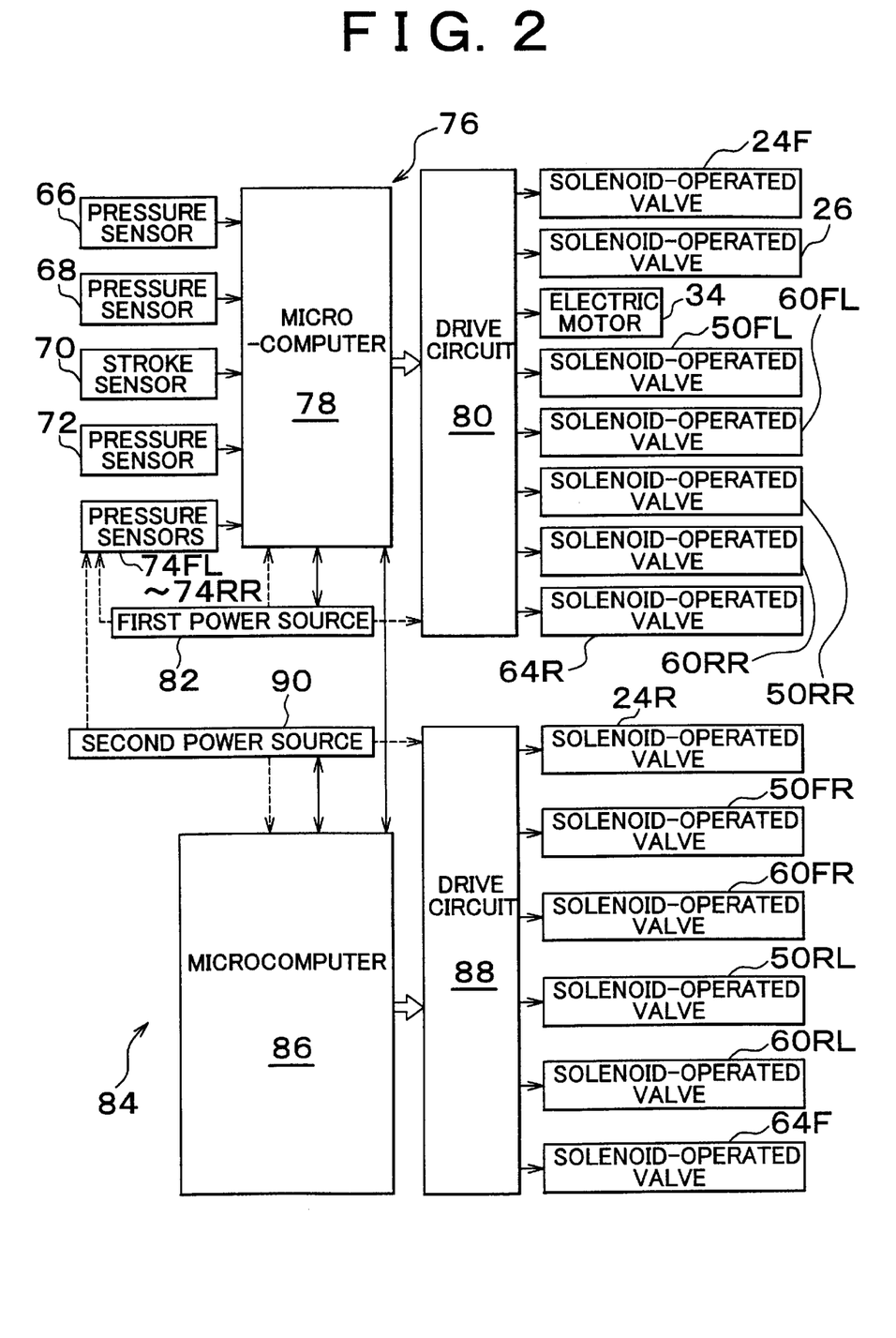
FIG. 2 is a block diagram showing first and second electronic control units employed in the embodiment of FIG. 1.

As shown in FIG. 2, a first electronic control unit 76 is provided for controlling the solenoid-operated valve 24F, the solenoid-operated valve 26, the electric motor 34, the solenoid-operated valves 50FL, 50RR, the solenoid-operated valves 60FL, 60RR, and the solenoid-operated valve 64R. The first electronic control unit 76 includes a microcomputer 78, a drive circuit 80 and a first power source 82. The first power source 82 supplies current for operating the microcomputer 78. The first power source 82 also supplies current for driving the solenoid-operated valve 24F and other components via the drive circuit 80.

As shown in FIG. 2, a second electronic control unit 84 is provided for controlling the solenoid-operated valve 24R, the solenoid-operated valves 50FR, 50RL, the solenoid-operated valves 60FR, 60RL, and the solenoid-operated valve 64F. The second electronic control unit 84 includes a microcomputer 86, a drive circuit 88, and a second power source 90. The second power source 90 supplies current for operating the microcomputer 86. The second power source 90 also supplies drive current for driving the solenoid-operated valve 24R and other components via the drive circuit 88.

Although not shown in FIG. 2, each of the first power source 82 and the second power source 90 includes a battery, an alternator, and the like. In the embodiment shown in FIGS. 1 and 2, the first power source 82 supplies current for operating the pressure sensors 68, 72, 74FL, 74RR and the stroke sensor 70. The second power source 90 supplies current for operating the pressure sensors 66, 74FR, 74RL. The microcomputers 78, 86 control the supply of the current from the first power source 82 and the second power source 90, respectively.

In the embodiment as shown in FIGS. 1 and 2, in particular, when the brake control apparatus is in a non-control mode in which no drive current is supplied to each of the above-indicated solenoid-operated valves and the electric motor 34, the solenoid-operated valves 24F, 24R, and the solenoid-operated valves 64F, 64R are maintained in the open states, and the solenoid-operated valve 26, the solenoid-operated valves 50FL, 50FR, 50RL, 50RR, and the solenoid-operated valves 60FL, 60FR, 60RL, 60RR are maintained in the closed states.

Although not shown in FIG. 2, each of the microcomputers 78, 86 may have a typical configuration in which a central processing unit (CPU), a read only memory (ROM), a random access memory (RAM), an input/output port, and the like, are mutually connected by a bidirectional common bus. The microcomputers 78, 86 communicate with each other as required.

The input/output port of the microcomputer 78 receives signals indicative of the second master cylinder pressure Pm1 and the second master cylinder pressure Pm2 from the pressure sensors 66, 68, respectively. The input/output port of the microcomputer 78 also receives a signal indicative of the depression stroke St of the brake pedal 12 from the stroke sensor 70, a signal indicative of the accumulator pressure Pa from the pressure sensor 72, and signals indicative of the pressures Pi(i=fl, fr, rl, rr) in the wheel cylinders 22FL to 22RR from the pressure sensors 74FL to 74RR, respectively. The input/output port of the microcomputer 78 further receives a signal indicative of a voltage Ve1 of the first power source 82 from an SOC meter (not shown in FIG. 2) provided in the first power source 82.

In the embodiment shown in FIG. 2, the input/output port of the microcomputer 86 does not receive signals from the pressure sensor 66 and other sensors, but receives a signal indicative of a pressure Ve2 of the second power source 90 from an SOC meter (not shown in FIG. 2) provided in the second power source 90.

Figure 3:
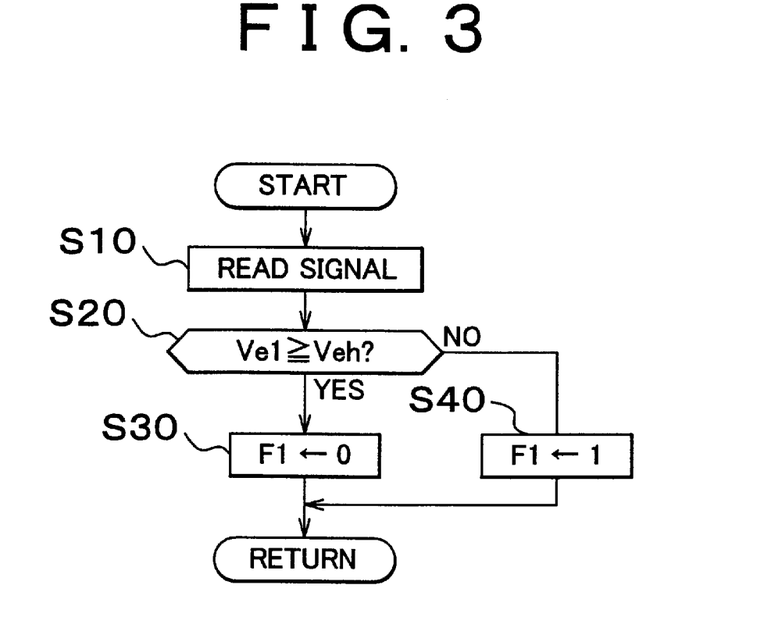
FIG. 3 is a flow chart showing a first power source voltage check routine to be executed by the first electronic control unit of the embodiment of FIG. 1 and FIG. 2.
Figure 5:
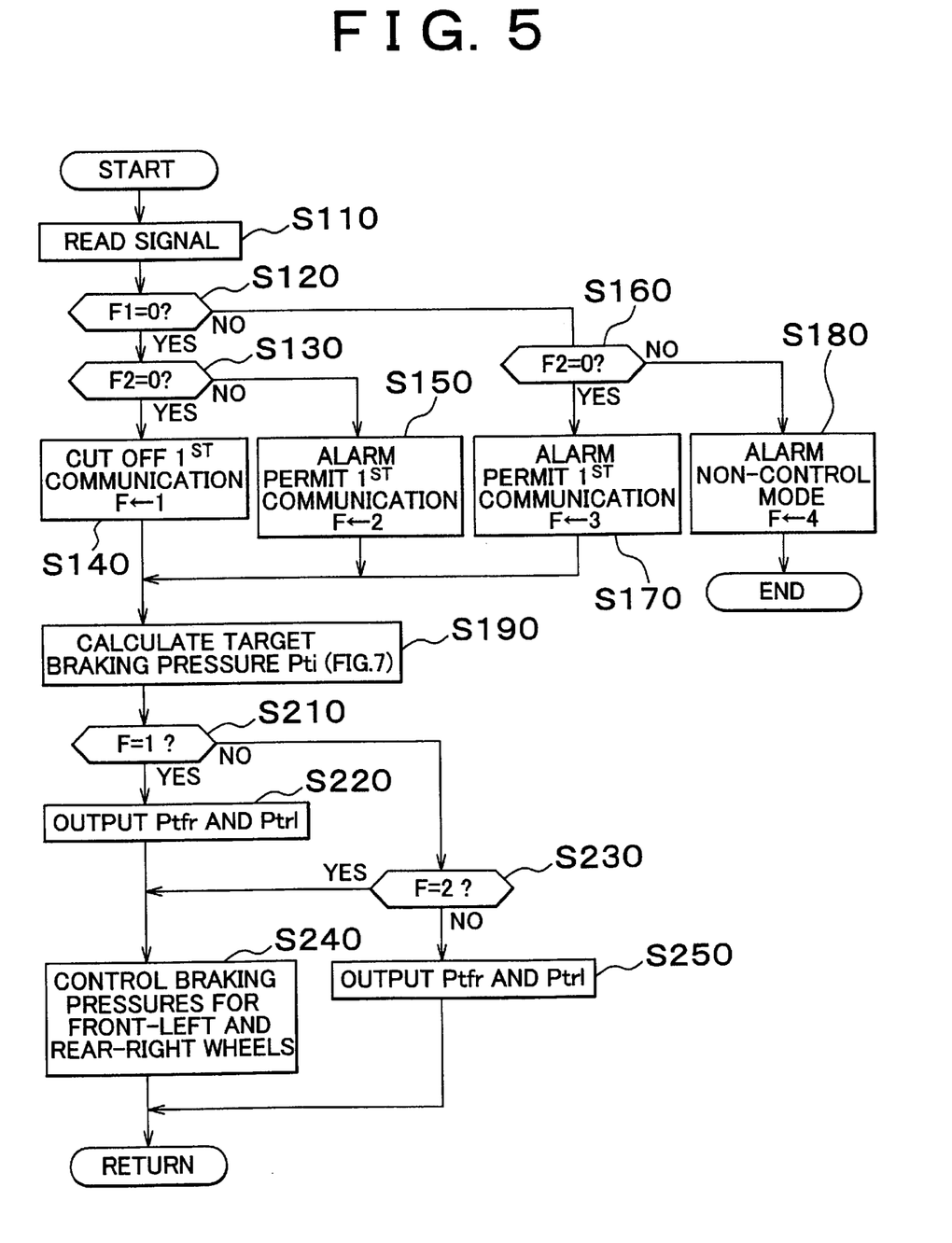
FIG. 5 is a flow chart showing a braking force control routine to be executed by the first electronic control unit of the embodiment of FIG. 1 and FIG. 2.

As will be described later, the ROM of the microcomputer 78 stores control routines as illustrated in FIG. 3 and FIG. 5. The CPU calculates a final target deceleration Gt based on the above-mentioned master cylinder pressures Pm1, Pm2 sensed by the pressure sensors 66, 68 and the depression stroke St sensed by the stroke sensor 70. The CPU also calculates a target braking pressure Pti(i=fl, fr, rl, rr) to be applied to each wheel, based on the final target deceleration Gt. The microcomputer 78 cooperates with the microcomputer 86 to control the wheel cylinder pressure of each wheel to be equal to the corresponding target braking pressure Pti.

In the present embodiment, in particular, the first electronic control unit 76 determines whether the voltage Ve1 of the first power source 82 is equal to or higher than a reference value Veh (a positive constant). The first electronic control unit 76 also determines whether the voltage Ve2 of the second power source 90 is equal to or higher than the reference value Veh. When both the voltages Ve1, Ve2 are equal to or higher than the reference value, the first electronic control unit 76 controls the solenoid-operated valves 50FL, 50RR and the solenoid-operated valves 60FL, 60RR while keeping the solenoid-operated valve 64R in the closed state so that the pressures in the wheel cylinders 22FL, 22RR become equal to the target braking pressures Ptfl, Ptrr, respectively. In addition, when both the voltages Ve1, Ve2 are equal to or higher than the reference value, the second electronic control unit 84 controls the solenoid-operated valves 50FR, 50RL and the solenoid-operated valves 60FR, 60RL while keeping the solenoid-operated valve 64F in the closed state so that the pressures in the wheel cylinders 22FR, 22RL become equal to the target braking pressures Ptfr, Ptrl, respectively.

On the other hand, when the voltage Ve1 of the first power source 82 is equal to or higher than the reference value Veh, but the voltage Ve2 of the second power source 90 is lower than the reference value Veh, the second electronic control unit 84 may become unable to operate normally. In this case, the second electronic control unit 84 returns the solenoid-operated valve 64F to the open state, and stops controlling the solenoid-operated valves 50FR, 50RL and the solenoid-operated valves 60FR, 60RL. In addition, the first electronic control unit 76 returns the solenoid-operated valve 64R to the open state, and controls the solenoid-operated valves 50FL, 50RR and the solenoid-operated valves 60FL, 60RR so that the pressures in the wheel cylinders 22FL, 22RR become equal to the target braking pressures Ptfl, Ptrr, respectively. Since the right and left wheel cylinders 22FR, 22FL and 22RR, 22RL are connected to each other for fluid communication via the corresponding connecting conduit 62F, 62R, the pressures in the wheel cylinders 22FR, 22RL are controlled to be equal to the target braking pressures Ptfl, Ptrr for the front-left and rear-right wheels opposite to the front-right and rear-left wheels, respectively.

On the contrary, when the pressure Ve2 of the second power source 90 is equal to or higher than the reference value Veh, but the pressure Ve1 of the first power source 82 is lower than the reference value Veh, the first electronic control unit 76 may become unable to operate normally. Accordingly, the first electronic control unit 76 returns the solenoid-operated valve 64R to the open state, and stops controlling the solenoid-operated valves 50FL, 50RR and the solenoid-operated valves 60FL, 60RR. Then, the second electronic control unit 84 returns the solenoid-operated valve 64F to the open state, and controls the solenoid-operated valves 50FR, 50RL and the solenoid-operated valve 60FR, 60RL so that the pressures in the wheel cylinders 22FR, 22RL become equal to the target braking pressures Ptfr, Ptrl, respectively. Since the right and left wheel cylinders 22FR, 22FL and 22RR, 22RL are connected to each other for fluid communication via the corresponding connecting conduit 62F, 62R, the pressures in the wheel cylinders 22FL, 22RR are controlled to the target braking pressures Ptfr, Ptrl for the front-right and rear-left wheels opposite to the front-left and rear-right wheels, respectively.

When both the voltage Ve1 of the first power source 82 and the voltage Ve2 of the second power source 90 are lower than the reference value Veh, both the first electronic control unit 76 and the second electronic control unit 84 may become unable to operate normally. In this case, the first electronic control unit 76 returns the solenoid-operated valves 24F, 64R to the open state, returns the solenoid-operated valve 26 to the closed state, and stops controlling the solenoid-operated valves 50FL, 50RR and the solenoid-operated valves 60FL, 60RR. Furthermore, the second electronic control unit 84 returns the solenoid-operated valves 24R, 64F to the open state, and stops controlling the solenoid-operated valves 50FR, 50RL and the solenoid-operated valves 60FR, 60RL. As a result, the brake system 10 operates in a non-control mode, and the master cylinder 14 controls the pressure in the wheel cylinder of each wheel.

Next, braking force control performed by the brake control apparatus of this embodiment will be described with reference to the flow charts shown in FIG. 3 to FIG. 7. The first electronic control unit 76 executes control routines according to the flow charts shown in FIG. 3 and FIG. 5. The control routines are started when an ignition switch (not shown) is turned on, and are executed repeatedly at predetermined time intervals. Similarly, the second electronic control unit 84 executes control routines according to the flow charts shown in FIG. 4 and FIG. 6. The control routines are started when the ignition switch (not shown) is turned on, and are executed repeatedly at predetermined time intervals.

FIG. 3 shows a first power source voltage check routine executed by the first electronic control unit 76. In step S10 of the routine, the microcomputer 78 reads a signal indicative of the voltage Ve1 of the first power source 82. In step S20, it is determined whether the voltage Ve1 is equal to or higher than a reference value Veh (a positive constant) required for continuing normal braking force control. When an affirmative determination is made, that is, when it is determined that the voltage Ve1 of the first power source 82 is in a normal range in step S20, a flag F1 is set to 0 in step S30. On the other hand, when a negative determination is made, that is, when it is determined that the voltage Ve1 of the first power source 82 is lower than the reference value in step S20, the flag F1 is set to 1 in step S40.

Figure 4:
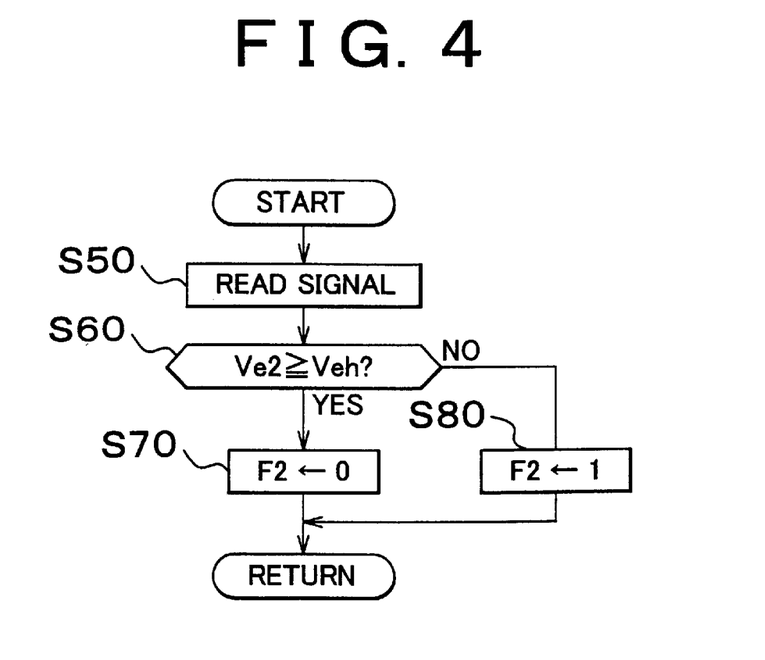
FIG. 4 is a flow chart showing a second power source voltage check routine to be executed by the second electronic control unit of the embodiment of FIG. 1 and FIG. 2.

FIG. 4 shows a second power source voltage check routine executed by the second electronic control unit 84. Similar to the above-mentioned step S10 and step S20, the microcomputer 86 reads a signal indicative of the voltage Ve2 of the second power source 90 in step S50, and it is determined in step S60 whether the voltage Ve2 is equal to or higher than the reference value Veh. When an affirmative determination is made, that is, when it is determined in step S60 that the voltage Ve2 of the second power source 90 is in a normal range, a flag F2 is set to 0 in step S70. On the other hand, when a negative determination is made, that is, when it is determined in step S60 that the voltage Ve2 of the second power source 90 is lower than the reference value, the flag F2 is set to 1 in step S80.

FIG. 5 shows a braking force control routine executed by the first electronic control unit 76. In step S110 of the routine, the first electronic control unit 76 reads a signal indicative of the second master cylinder pressure Pm1 sensed by the pressure sensor 66 and other signals.

Although not shown in the flow chart, the solenoid-operated valve 24F and other components are set in respective controlled positions prior to step S110. In addition, an initial check is performed for determining whether there is any disconnection or short-circuit in the pressure sensor 66 and other sensors. When there is a disconnection or a short-circuit in one or more of the pressure sensors, the control according to the flow chart of FIG. 5 is finished while the brake system 10 is maintained in the non-control mode. On the other hand, when there is no abnormality in the above-indicated sensors, step S110 is performed after the brake system 10 is set in the control mode.

In step S120, it is determined whether the flag F1 is equal to 0, that is, whether the voltage Ve1 of the power source 82 is normal. When a negative determination is made in step S120, that is, when it is determined that the voltage Ve1 of the power source 82 is lower than the reference value, control proceeds to step S160. On the other hand, when a positive determination is made in step S120, that is, when it is determined that the voltage of the first power source 82 is in a normal range, control proceeds to step S130.

In step S130, it is determined whether the flag F2 is equal to 0. When a positive determination is made in step S130, that is, when it is determined that the voltage Ve2 of the second power source 90 is in a normal range, the solenoid-operated valve 64R that is part of the first communication control device is closed or is kept in the closed state in step S140, so as to cut off the first connecting conduit 62R. In addition, flag F is set to 1. On the other hand, when a negative determination is made in step S130, that is, when it is determined that the voltage of the second power source 90 is lower than the reference value, an alarm device (not shown) is activated in step S150 to generate an alarm indicating that the voltage of the second power source 90 is lower than the reference value. In addition, the solenoid-operated valve 64R is opened or is kept in the open state, and the flag F is set to 2 in step S150.

In step S160, it is determined whether the flag F2 is equal to 0. When a positive determination is made in step S160, that is, when it is determined that the voltage of the second power source 90 is in a normal range, an alarm indicating that the voltage of the first power source 82 is lower than the reference value is generated in step S170. In addition, the solenoid-operated valve 64R that is part of the first communication control device is opened or is kept in the open state, and the flag F is set to 3 in step S170. On the other hand, when a negative determination is made in step S160, that is, when it is determined that the voltage of the second power source 90 is lower than the reference value, an alarm is generated in step S180 so as to indicate that the voltages of the first and second power sources 82, 90 are lower than the reference value. In step S180, each of the solenoid-operated valves is set in the non-control mode, and the flag F is set to 4. Then, the control according to the routine as shown in FIG. 5 is finished.

Figure 7:
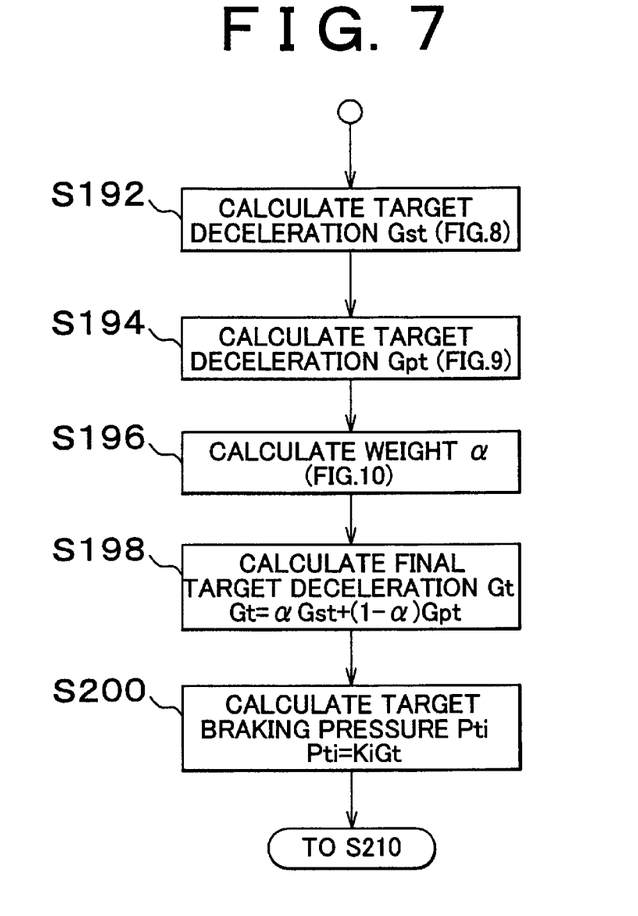
FIG. 7 is a flow chart showing a target braking pressure calculating routine performed in step S190 in FIG. 5.

In step S190, the target braking pressure Pti for each wheel is calculated according to the routine shown in FIG. 7. In step S210, it is determined whether the flag F is equal to 1. That is, it is determined whether the first electronic control unit 76 and the second electronic control unit 84 can continue normal braking force control operations. When a negative determination is made in step S210, the process proceeds to step S230. On the other hand, when a positive determination is made in step S210, the first electronic control unit 76 transmits signals indicative of the target braking pressure Ptfr for the front-right wheel and the target braking pressure Ptrl for the rear-left wheel to the second electronic control unit 84 in step S220.

In step S230, it is determined whether the flag F is equal to 2, namely, whether the flag F1 set in the routine of FIG. 3 is equal to 0 and the flag F2 set in the routine of FIG. 4 is equal to 1. In other words, it is determined whether there is a possibility that the second electronic control unit 84 is not able to continue its normal braking force control operation. When a positive determination is made in step S230, the pressures in the wheel cylinders of the front-left wheel and the rear-right wheel are controlled to the target braking pressures Ptfl, Ptrr, respectively, in step S240. Since the solenoid-operated valve 64F as the second communication control device is placed in the open state when the flag F is equal to 2, as described later with reference to FIG. 6, the controlled pressures applied to the wheel cylinders of the front-left wheel and the rear-right wheel are also applied to the wheel cylinders of the front-right wheel and the rear-left wheel. Then, the process returns to step S110.

On the other hand, when a negative determination is made in step S230, namely, when the flag F is equal to 3, on the other hand, there is a possibility that the first electronic control unit 76 is not able to continue its normal braking force control operation. In this case, the first electronic control unit 76 transmits signals indicative of the target braking pressure Ptfr for the front-right wheel and the target braking pressure Ptrl for the rear-left wheel to the second electronic control 84 in step 250. Thus, the pressures in the wheel cylinders of the front-right wheel and the rear-left wheel are controlled to the target braking pressures Ptfr, Ptrl, respectively. Since the solenoid-operated valve 64R as the first communication control device is placed in the open state in step S170 of FIG. 5, the controlled pressures applied to the wheel cylinders of the front-right wheel and the rear-left wheel are also applied to the wheel cylinders of the front-left wheel and the rear-right wheel. Then, the process returns to step S110.

Figure 6:
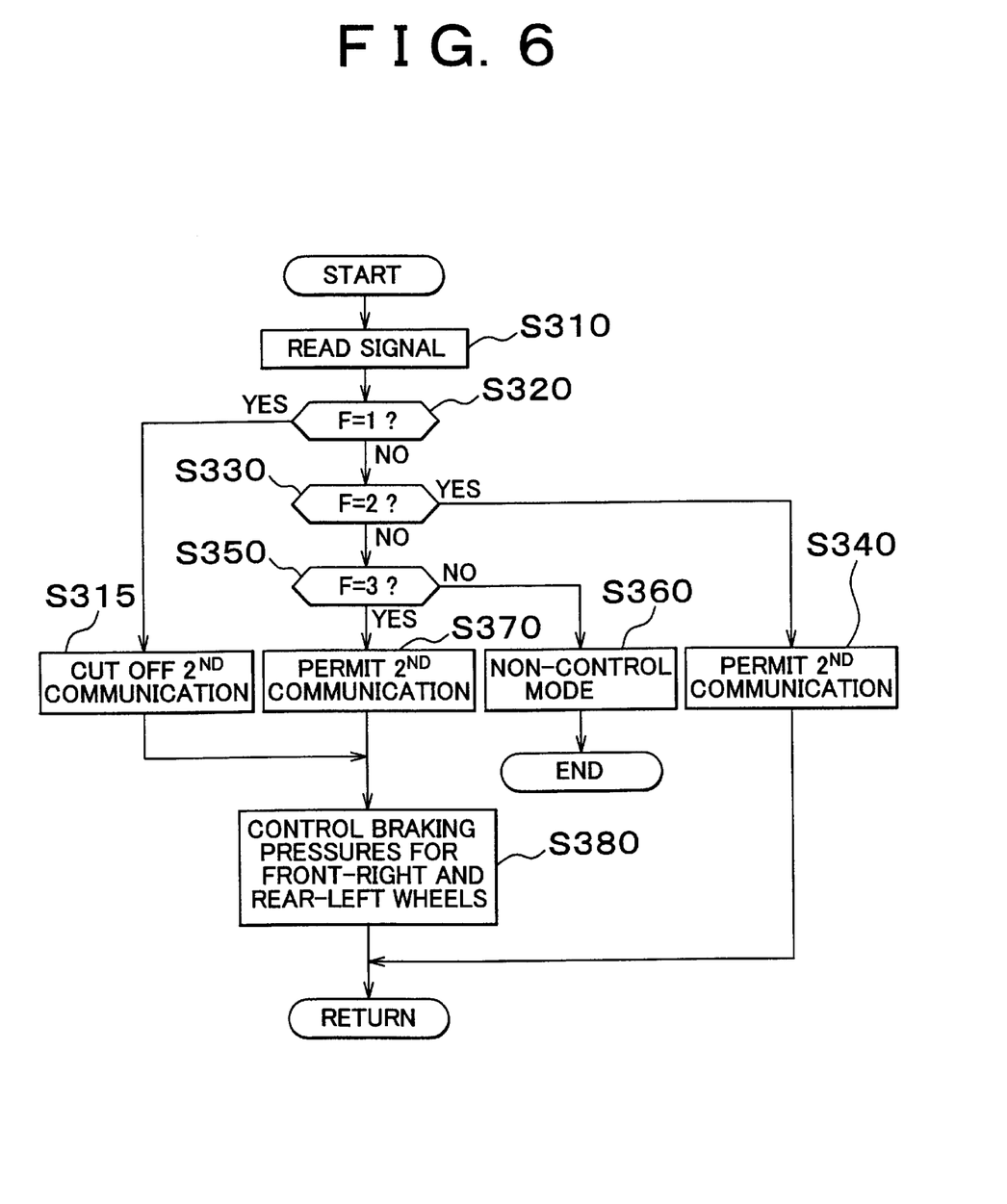
FIG. 6 is a flow chart showing a braking force control routine to be executed by the second electronic control unit of the embodiment of FIG. 1 and FIG. 2.

FIG. 6 shows a braking force control routine executed by the second electronic control unit 84. In step S310 of the routine, the microcomputer 86 of the second electronic control 84 reads the flag F from the first electronic control unit 76. In step S320, it is determined whether the flag F is equal to 1. That is, it is determined whether the first electronic control unit 76 and the second electronic control unit 84 can continue normal braking force control operations. When a negative determination is made in this step S320, the process proceeds to step S330. When a positive determination is made in step S320, the solenoid-operated valve 64F that is part of the second communication control device is closed in step S315. Then, the process proceeds to step S380.

In step S330, it is determined whether the flag F is equal to 2. That is, it is determined whether the second electronic control unit 84 may become unable to continue its normal braking force control operation. When a negative determination is made in step S330, namely, when the flag F is not equal to 2, the process proceeds to step S350. When a positive determination is made in step S330, on the other hand, the solenoid-operated valve 64F that provides the second communication control device is opened or is maintained in the open state in step S340. Then, the process returns to step S310.

In step S350, it is determined whether the flag F is equal to 3. That is, it is determined whether the first electronic control unit 76 may become unable to continue its normal braking force control operation. When a positive determination is made in step S350, the process proceeds to step S370. On the other hand, when a negative determination is made, that is, when it is determined that neither the first electronic control unit 76 nor the second electronic control unit 84 can continue the normal braking force control operations, each of the valves is set in the non-control mode in step S360. Then, the control according to the routine shown in FIG. 6 is finished.

In step S370, the solenoid-operated valve 64F that is part of the second communication control device is opened or is maintained in the open state. Since the first electronic control unit 76 may become unable to continue its normal braking force control operation with the flag F being equal to 3, the wheel cylinder 22FL is brought into communication with the wheel cylinder 22FR via the solenoid-operated valve 64F. As described above, the solenoid-operated valve 64R is also placed in the open state when the flag F is equal to 3. In step S380, the pressures in the wheel cylinder 22FR of the front-right wheel and the wheel cylinder 22RL of the rear-left wheel are controlled to the target braking pressures Ptfr, Ptrl, respectively. With the solenoid-operated valves 64R, 64F thus opened, the controlled pressures applied to the wheel cylinders 22FR, 22RL are also applied to the wheel cylinders 22FL, 22RR. Then, the process returns to step S310.

Figure 8:
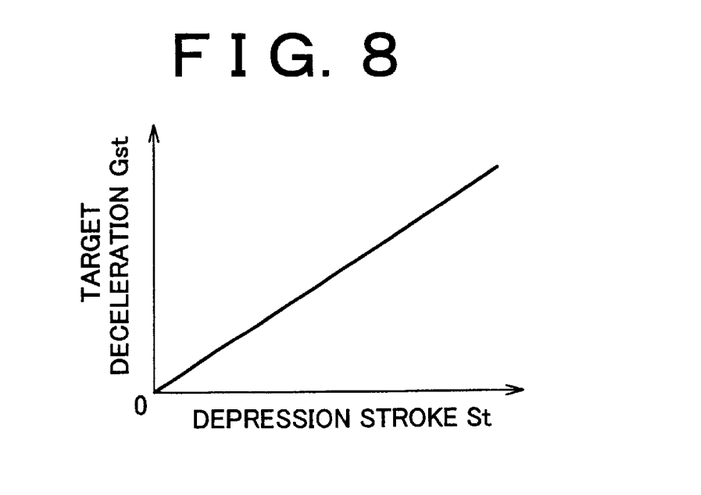
FIG. 8 is a graph showing the relation between a brake pedal depression stroke St and a target deceleration Gst.
Figure 9:
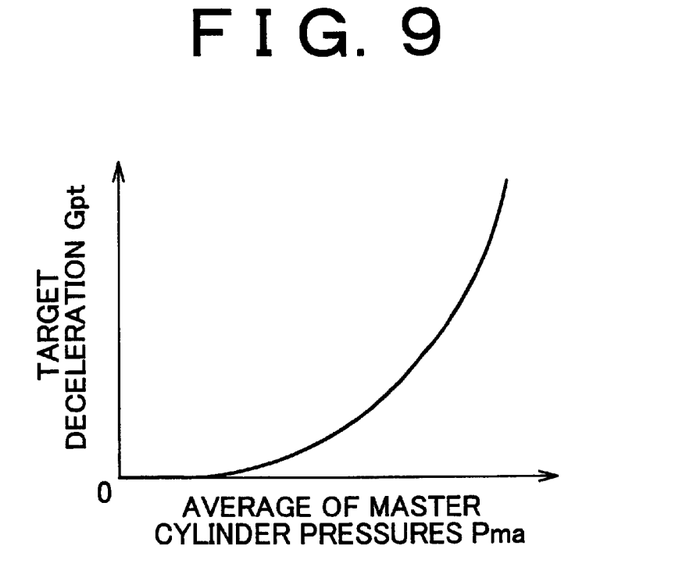
FIG. 9 is a graph showing the relation between the average value Pma of master cylinder pressures and a target deceleration Gpt.

FIG. 7 shows a routine for calculating the target braking pressures Pti to be applied to the respective wheel cylinders 22FL, 22FR, 22RL, 22RR, which routine is performed in the above-mentioned step S190. In step S192 of the routine, a target deceleration Gst based on a depression stroke is calculated based on the depression stroke St sensed by the stroke sensor 70, according to a map corresponding to a graph as shown in FIG. 8. In step S194, an average value Pma of the first master cylinder pressure Pm1 and the second master cylinder pressure Pm2 is calculated, and a target deceleration Gpt based on a master cylinder pressure is calculated based on the average value Pma according to a map corresponding to the graph shown in FIG. 9.

Figure 10:
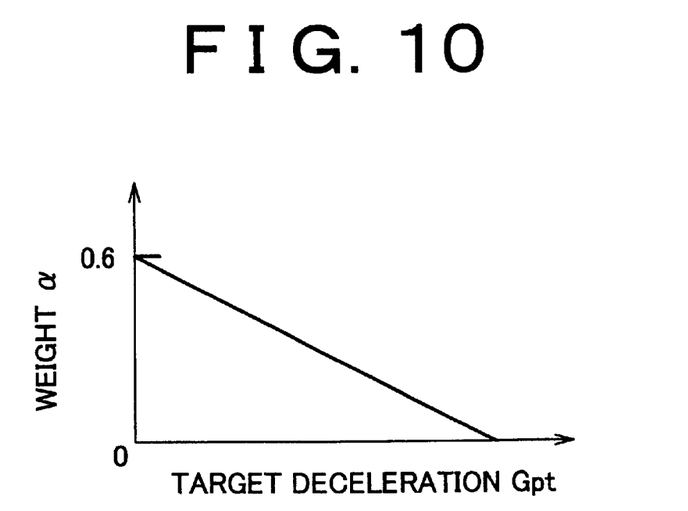
FIG. 10 is a graph showing the relation between the target deceleration Gpt and a weight α with which the target deceleration Gst is weighted.

In step S196, a weight $\alpha(0 \leq \alpha \leq 0.6)$ given to the target deceleration Gst is calculated based on the target deceleration Gpt according to a map corresponding to the graph shown in FIG. 10. In step S198, the final target deceleration Gt is calculated as a weighted sum of the target deceleration Gpt and the target deceleration Gst according to an equation (1) as indicated below. In this embodiment, the weight $\alpha$ is set so as to satisfy the condition of $0 \leq \alpha \leq 0.6$. However, it is to be understood that the maximum value of the weight $\alpha$ is not limited to 0.6, but may be any value between 0 and 1 both inclusive.

$$Gt = \alpha Gst + (1 \cdot \alpha) Gpt \quad (1)$$

In step S200, the target braking pressure Pti(i=fl, fr, rl, rr) in the wheel cylinder of each wheel is calculated according to an equation (2) as indicated below. In the equation (2), Ki(i=fl, fr, rl, rr) is a coefficient (a positive constant) of the target braking pressure Pti in the wheel cylinder of each wheel with respect to the final target deceleration Gt. Then, the process proceeds to step S210.

$$Pti = Ki \cdot Gt \quad (2)$$

Thus, in the embodiment as described above, it is determined whether the voltage Ve1 of the first power source 82 and the voltage Ve2 of the second power source 90 are lower than the reference value Veh in steps S20 to S40 and steps S60 to S80, respectively. In other words, it is determined whether the first electronic control unit 76 and the second electronic control unit 84 may become unable to operate normally due to reductions in the voltages of the corresponding power sources 82, 90 in steps S20 to S40 and steps S60 to S80, respectively.

When both the voltage Ve1 of the first power source 82 and the voltage Ve2 of the second power source 90 are equal to or higher than the reference value, both the flags F1, F2 are set to 0. Accordingly, a positive determination is made in steps S120 and S130 of the flow chart of FIG. 5 showing the routine executed by the first electronic control unit 76. Then, the solenoid-operated valve 64F is closed in step S140. In addition, a positive determination is made in step S320 of the flow chart of FIG. 6 showing the routine executed by the second electronic control unit 84. Thus, the solenoid-operated valve 64R is cut off or closed in step S315.

Then, the target braking pressure Pti for each wheel is calculated in step S190 in FIG. 5, and a positive determination is made in step S210. Thus, in step S240, the braking pressures for the front-left wheel and the rear-right wheel are controlled to the target braking pressures Ptfl, Ptrr, respectively. In addition, in step S380 in FIG. 6, the braking pressures for the front-right wheel and the rear-left wheel are controlled to the target braking pressures Ptfr, Ptrl, respectively.

When the voltage Ve1 of the first power source 82 is equal to or higher than the reference value Veh, but the voltage Ve2 of the second power source 90 is lower than the reference value Veh, the flag F1 is set to 0, but the flag F2 is set to 1. Accordingly, a positive determination is made in step S120 of the flow chart of FIG. 5 showing the routine executed by the first electronic control unit 76, and a negative determination is made in step 130. Thus, in step S150, the solenoid-operated valve 64R is opened, so that the wheel cylinders 22RL, 22RR of the rear-left and rear-right wheels are brought into communication with each other. Further, a positive determination is made in step S230, so that the braking pressures for the front-left wheel and rear-right wheel are controlled to the target braking pressures Ptfl, Ptrr in step S240.

In the above case where the flag F is equal to 2, a negative determination is made in step S320 of the flow chart of FIG. 6 showing the routine executed by the second electronic control unit 84, and a positive determination is made in step S330. Then, in step S340, the wheel cylinders 22FL, 22FR of the front-left and front-right wheels are brought into communication with each other via the solenoid-operated valve 64F as the second communication control device. With both of the solenoid-operated valves 64R, 64F placed in the open states as described above, the pressures for the front-right wheel and the rear-left wheel are controlled to be equal to the pressures for the front-left wheel and the rear-right wheel, respectively.

On the contrary, when the voltage Ve2 of the second power source 90 is equal to or higher than the reference value Veh, but the voltage Ve1 of the first power source 82 is lower than the reference value Veh, the flag F2 is set to 0, but the flag F1 is set to 1. Accordingly, a negative determination is made in step S120 of the flow chart of FIG. 5, and a positive determination is made in step S160. Thus, in step S170, the solenoid-operated valve 64R is opened so that the wheel cylinders 22RL, 22RR of the rear-left and rear-right wheels are brought into communication with each other. Further, a negative determination is made in step S230, and step S250 is executed to transmit signals indicative of the target braking pressures Ptfr, Ptrl for the front-right wheel and the rear-left wheel to second electronic control unit 84.

In the above case where the flag F is equal to 3, a negative determination is made in steps S320 and S330 of the flow chart of FIG. 6, and a positive determination is made in step S350. Further, in step S370, the wheel cylinders 22FL, 22FR of the front-left and front-right wheels are brought into communication with each other via the solenoid-operated valve 64F. With both of the solenoid-operated valves 64R, 64F thus opened, the pressures for the front-right wheel and the rear-left wheel are controlled to be equal to the pressures for the front-left wheel and the rear-right wheel, respectively.

Furthermore, when both the voltage Ve1 of the first power source 82 and the voltage Ve2 of the second power source 90 are lower than the reference value Veh, both the flags F1, F2 are set to 1. Accordingly, a negative determination is made in each of the above steps 120 and 160 of the flow chart of FIG. 5 showing the routine executed by the first electronic control unit 76. Also, negative determinations are made in steps S320, S330 and S350 of the flow chart of FIG. 6 showing the routine performed by the second electronic control unit 84. As a result, in steps S180 and S360, the brake system 10 is returned to the non-control mode in which the master cylinder 14 controls the pressure in the wheel cylinder of each wheel. Thus, it is possible to reliably prevent the pressure in the wheel cylinder of each wheel from being controlled to an abnormal value by the first and second electronic control units.

According to the above-described embodiment of the invention, the solenoid-operated valves 64F, 64R are opened when the voltage of the first power source 82 or the second power source 90 is undesirably lowered and the first electronic control unit 76 or the second electronic control unit 84 may not be able to continue its normal braking force control operation. With the valves 64F, 64R thus kept in the open state, the control unit 76 or 84 whose power source voltage is in a normal range controls the braking pressures for the front-left and rear-right wheels or the front-right and rear-left wheels to the corresponding target braking pressures, and controls the braking pressures for the front-right and rear-left wheels or the front-left and rear-right wheels so that the braking pressures for the right and left wheels become equal to the same level. Accordingly, when a voltage of a power source for one of the two control units is undesirably lowered, the braking pressures for the wheels to be controlled by the above-indicated one control unit are reliably prevented from being controlled to abnormal values.

In the illustrated embodiment, in particular, when the voltage of one of the power sources becomes lower than the reference value, the control unit corresponding to the failing power source does not perform control of the pressure increasing control valves and pressure reducing control valves. Therefore, it is possible to reliably prevent unnecessary consumption of power by the power source due to control of these pressure regulating valves.

In addition, according to the illustrated embodiment, when the voltage of one of the power sources becomes lower than the reference value, the solenoid-operated valves 64R, 64F are opened so that the wheel cylinders of the front-right and front-left wheels and the wheel cylinders of the rear-right and rear-left wheels are brought into communication with each other. Therefore, the braking pressures for both of the front wheels and rear wheels can be reliably controlled such that the braking pressures for each pair of the right and left wheels become equal to the same level. Accordingly, it is possible to reliably prevent a yaw moment from acting on the vehicle due to an otherwise possible difference between the braking pressures for the right and left wheels, thereby avoiding deterioration of the behavior or stability of the vehicle due to the yaw moment.

Furthermore, according to the illustrated embodiment, the solenoid-operated valves 64F, 64R that are part of the communication control devices for controlling communication between the right and left wheel cylinders are normally-open type valves that are placed in their open states when no energizing current is supplied to the valves. Therefore, when the voltage of one of the power sources becomes lower than the reference value, the right and left wheel cylinders can be kept connected or communicating with each other without consuming power of the power sources for keeping the valves 64F, 64R in the open states. Accordingly, as compared with a case where the solenoid-operated valves 64F, 64R are normally-closed type valves, it is possible to reduce power consumption for keeping the solenoid-operated valves 64F, 64R in the open states when the voltage of one of the power sources becomes lower than the reference value, thus surely preventing a further reduction in the voltage of the power source due to the power consumption.

While the invention has been described in detail with reference to one preferred embodiment, it will be apparent to those skilled in the art that the invention is not limited to the above-mentioned embodiment, and that the invention may be realized in various other embodiments within the scope of the invention.

In the above-mentioned embodiment, when the second electronic control unit 84 or the first electronic control unit 76 may become unable to operate normally, the solenoid-operated valves 64F, 64R are opened so that the right and left wheel cylinders are connected to each other to permit fluid communication therebetween. However, these solenoid-operated valves and the corresponding connecting conduits may also serve to communicate the right and left wheel cylinders with each other when an abnormality occurs in the solenoid-operated valve 50FL as well as any other of the valves serving as pressure regulating devices.

In the above-mentioned embodiment, the solenoid-operated valves 64F, 64R are closed when the second electronic control unit 84 and the first electronic control unit 76 are able to operate normally. However, these solenoid-operated valves may be configured so as to be closed when the braking force for each wheel needs to be controlled separately, for example, when behavior control or vehicle stability control, antiskid control, or traction control is performed in a braking force control type vehicle.

In the above-mentioned embodiment, when both the voltage Ve1 of the first power source 82 and the voltage Ve2 of the second voltage source 90 become lower than the reference value Veh, the brake system 10 is returned to the non-control mode. However, the embodiment may be modified such that a second reference value Ves lower than the reference value Veh is set, and the brake system 10 is returned to the non-control mode when the voltage of one of the power sources becomes lower than the second reference value Ves even if the voltage of the other power source is equal to or higher than the reference value Veh.

In the above-mentioned embodiment, even if the voltage of one of the power sources becomes lower than the reference value Veh, the above-indicated one power source continues to supply drive current to the corresponding sensors and the like. However, the embodiment may be modified such that, when the voltage of one power source becomes lower than the reference value Veh, the other power source supplies drive current via a relay circuit or the like to the sensors and the like to which the above-indicated one power source has supplied drive current up to that time.

In the above-mentioned embodiment, only the first control unit 76 is adapted to calculate the target braking pressure Pti for each wheel, and continues the calculation even when the voltage of one of the power sources for the control unit 76 becomes lower than the reference value Veh. However, the embodiment may be modified such that the first and second electronic control units perform parallel operations for calculating the target braking pressures. In this case, if the voltage of one of the power sources becomes lower than the reference value, the electronic control unit corresponding to the other power source having a normal voltage may continue calculation of the target braking pressures.

In the above-mentioned embodiment, the braking pressure for each wheel is controlled to the target braking pressure calculated based on the average value Pma of the first and second master cylinder pressures and the depression stroke St of the brake pedal. However, the target braking pressure for each wheel may be calculated according to any method known in the art, as long as the target braking pressure for each wheel is controlled based on the amount of the braking operation performed by the driver upon normal braking of the vehicle.

Further, in the above-mentioned embodiment, the solenoid-operated valves 64F, 64R which cooperate with the connecting conduits 62F, 62R to constitute the first and second communication control devices, respectively are normally-open type valves. However, these solenoid-operated valves may be normally-closed type valves, which are in the closed states when no energizing current is supplied to the solenoids of the valves.

The controller (the electronic control units 76 and 84) of the illustrated embodiment is implemented as one or more programmed general purpose computers. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A brake control apparatus for a motor vehicle, comprising:
    first and second pressure regulators that regulate a pressure of a hydraulic fluid supplied from a high-pressure fluid supply source to first and second wheel cylinders;
    a first communication control device that controls fluid communication between the first and second wheel cylinders, the first communication control device being connected between the first pressure regulator and the first wheel cylinder and between the second pressure regulator and the second wheel cylinder; and
    a controller that controls the first and second pressure regulators according to at least an amount of a braking operation performed by a vehicle operator, the controller comprising first and second control units that control the first and second pressure regulators, respectively; and wherein the controller:
    determines whether one of the first and second control units may be failing to operate normally, and
    places the first communication control device in an operating position for communicating the first and second wheel cylinders with each other when it is determined that one of the first and second control units may be failing to operate normally.

2. The brake control apparatus according to claim 1, wherein when the controller determines that one of the first and second control units may be failing to operate normally, the controller stops using the failing one of the first and second control units to control its corresponding pressure regulator, and controls the other of the first and second pressure regulators corresponding to the other control unit.

3. The brake control apparatus according to claim 2, wherein the first and second wheel cylinders are provided for a left wheel and a right wheel, respectively.

4. The brake control apparatus according to claim 1, wherein the first and second wheel cylinders are provided for a left wheel and a right wheel, respectively.

5. The brake control apparatus according to claim 4, further comprising:
    third and fourth pressure regulators that regulate a pressure of a hydraulic fluid supplied from the high-pressure fluid supply source to third and fourth wheel cylinders; and
    a second communication control device that controls fluid communication between the third and fourth wheel cylinders, the second communication control device being connected between the third pressure regulator and the third wheel cylinder and between the fourth pressure regulator and the fourth wheel cylinder,
    wherein the first and second wheel cylinders are provided for a front-left wheel and a front-right wheel, respectively, and the third and fourth wheel cylinders are provided for a rear-left wheel and a rear-right wheel, respectively; and
    wherein the first communication control device is controlled by one of the first and second control units, and the second communication control device is controlled by the other of the first and second control units.

6. The brake control apparatus according to claim 5, wherein the first control unit controls the pressure regulator for one of the front-left and front-right wheels and the pressure regulator for one of the rear-right and rear-left wheels, and the second control unit controls the pressure regulator for the other of the front-left and front-right wheels and the pressure regulator for the other of the rear-right and rear-left wheels, such that braking pressures for the front-left and rear-right wheels are controlled by one of the first and second control units, and braking pressures for the front-right and rear-left wheels are controlled by the other of the first and second control units.

7. The brake control apparatus according to claim 1, wherein:
    the first control unit comprises a first power source that supplies power for controlling the first pressure regulator, and the second control unit comprises a second power source that supplies power for controlling the second pressure regulator; and
    the controller determines that one of the first and second control units may be failing to operate normally when a voltage of one of the first and second power sources is reduced to be less than a first reference value.

8. The brake control apparatus according to claim 7, further comprising:
a master cylinder that generates a pressure in response to a braking operation performed by the vehicle operator, wherein
when voltages of both of the first and second power sources are less than the first reference value, the high-pressure fluid supply source is inhibited from communicating with the first and second wheel cylinders, and the master cylinder is brought into communication with the first and second wheel cylinders such that the pressure generated in the master cylinder is applied to the first and second wheel cylinders.

9. The brake control apparatus according to claim 7, further comprising:
a master cylinder that generates a pressure in response to a braking operation performed by the vehicle operator, wherein
when a voltage of one of the first and second power sources is less than a second reference value that is lower than the first reference value, the high-pressure fluid supply source is inhibited from communicating with the first and second wheel cylinders, and the master cylinder is brought into communication with the first and second wheel cylinders such that the pressure generated in the master cylinder is applied to the first and second wheel cylinders.

10. The brake control apparatus according to claim 7, wherein when the controller determines that one of the first and second control units may be failing due to a reduction in the voltage of one of the first and second power sources, one of the first and second control units that corresponds to the one of the first and second power sources stops controlling the corresponding pressure regulator, and the other of the first and second control units that corresponds to the other power source controls the corresponding pressure regulator.

11. The brake control apparatus according to claim 10, further comprising:
a master cylinder that generates a pressure in response to a braking operation performed by the vehicle operator, wherein
when voltages of both of the first and second power sources are less than the first reference value, the high-pressure fluid supply source is inhibited from communicating with the first and second wheel cylinders, and the master cylinder is brought into communication with the first and second wheel cylinders such that the pressure generated in the master cylinder is applied to the first and second wheel cylinders.

12. The brake control apparatus according to claim 10, further comprising:
a master cylinder that generates a pressure in response to a braking operation performed by the vehicle operator, wherein
when a voltage of one of the first and second power sources is less than a second reference value that is lower than the first reference value, the high-pressure fluid supply source is inhibited from communicating with the first and second wheel cylinders, and the master cylinder is brought into communication with the first and second wheel cylinders such that the pressure generated in the master cylinder is applied to the first and second wheel cylinders.

13. The brake control apparatus according to claim 1, wherein the first communication control device comprises a communication passage that communicates the first and second wheel cylinders with each other, and a solenoid-operated valve that is provided in the communication passage.

14. The brake control apparatus according to claim 13, wherein the solenoid-operated valve is in an open state when no current is supplied thereto.

15. A method of controlling a brake system of a vehicle including (a) first and second pressure regulators that regulate a pressure of a hydraulic fluid supplied from a high-pressure fluid supply source to first and second wheel cylinders, (b) a first communication control device that controls fluid communication between the first and second wheel cylinders, the first communication control device being connected between the first pressure regulator and the first wheel cylinder and between the second pressure regulator and the second wheel cylinder, and (c) a controller that controls the first and second pressure regulators according to at least an amount of a braking operation performed by a vehicle operator, the controller comprising first and second control units that control the first and second pressure regulators, respectively, the method comprising the steps of:
determining whether one of the first and second control units may be failing to operate normally; and
placing the first communication control device in an operating position for communicating the first and second wheel cylinders with each other when it is determined that one of the first and second control units may be failing to operate normally.

16. The method according to claim 15, further comprising, when it is determined that one of the first and second control units may be failing to operate normally, stopping using the failing one of the first and second control units to control its corresponding pressure regulator, and controlling the other of the first and second pressure regulators corresponding to the other control unit.

17. The method according to claim 15, wherein:
the first control unit comprises a first power source that supplies power for controlling the first pressure regulator, and the second control unit comprises a second power source that supplies power for controlling the second pressure regulator; and
it is determined that one of the first and second control units may be failing to operate normally when a voltage of one of the first and second power sources is reduced to be less than a first reference value.

18. The method according to claim 17, wherein:
the brake system further comprises a master cylinder that generates a pressure in response to a braking operation performed by the vehicle operator; and
when voltages of both of the first and second power sources are less than the first reference value, the high-pressure fluid supply source is inhibited from communicating with the first and second wheel cylinders, and the master cylinder is brought into communication with the first and second wheel cylinders such that the pressure generated in the master cylinder is applied to the first and second wheel cylinders.

19. The method according to claim 17, wherein:
the brake system further comprises a master cylinder that generates a pressure in response to a braking operation performed by the vehicle operator; and
when a voltage of one of the first and second power sources is less than a second reference value that is lower than the first reference value, the high-pressure fluid supply source is inhibited from communicating with the first and second wheel cylinders, and the master cylinder is brought into communication with the first and second wheel cylinders such that the pressure generated in the master cylinder is applied to the first and second wheel cylinders.

20. The method according to claim 17, wherein when it is determined that one of the first and second control units may be failing due to a reduction in the voltage of one of the first and second power sources, one of the first and second control units that corresponds to the one of the first and second power sources stops controlling the corresponding pressure regulator, and the other of the first and second control units that corresponds to the other power source controls the corresponding pressure regulator.

* * * * *